UNITED STATES PATENT OFFICE.

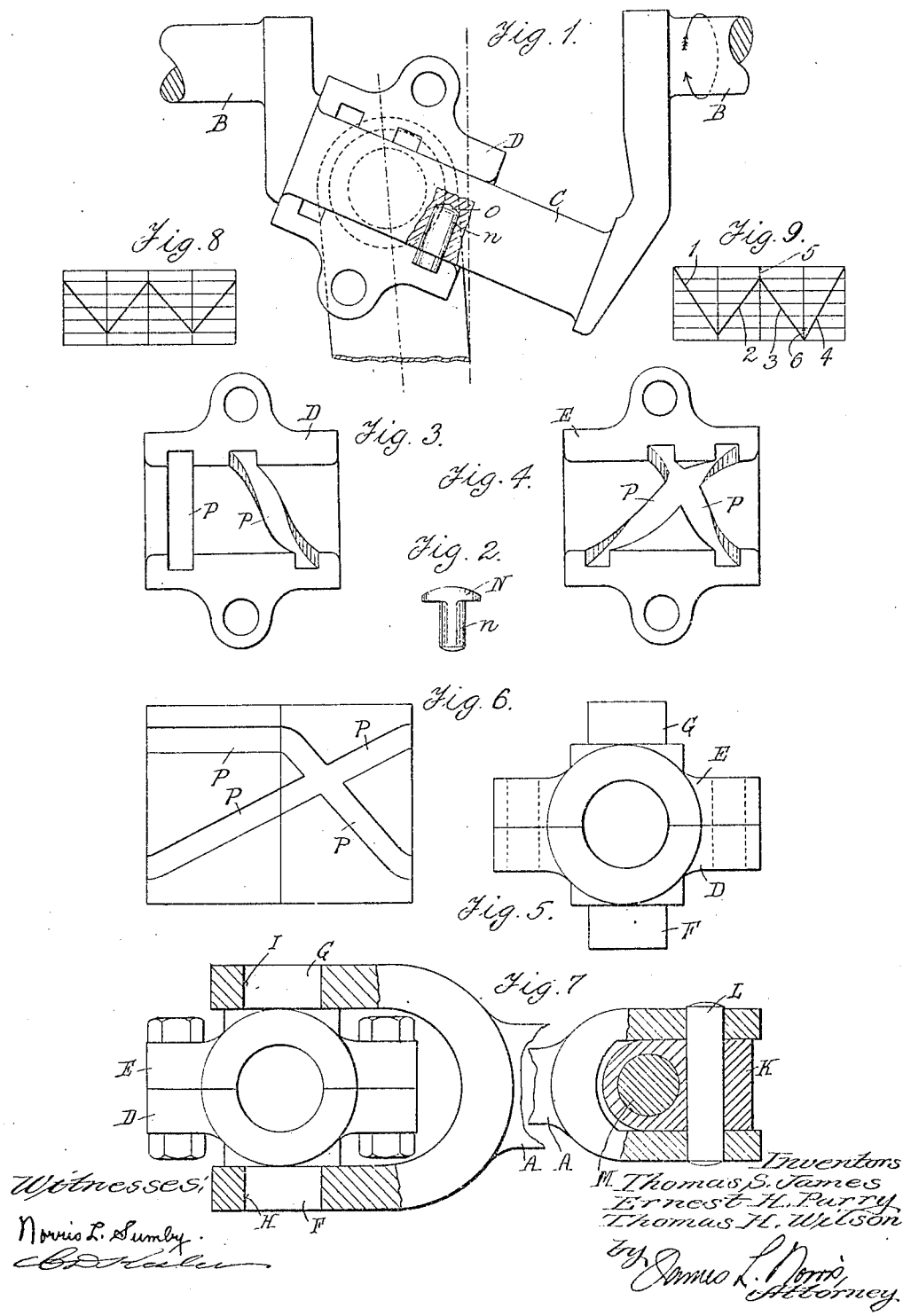

THOMAS S. JAMES, ERNEST H. PARRY, AND THOMAS H. WILSON, OF LONDON, ENGLAND.

CONSTRUCTION OF INTERNAL-COMBUSTION ENGINES.

1,291,531. Specification of Letters Patent. Patented Jan. 14, 1919.

Application filed July 8, 1918. Serial No. 243,900.

*To all whom it may concern:*

Be it known that we, THOMAS SPENCER JAMES, ERNEST HENRY PARRY, and THOMAS HERBERT WILSON, subjects of the King of Great Britain, residing at London, England, have invented new and useful Improvements in the Construction of Internal-Combustion Engines, of which the following is a specification.

This invention relates to internal combustion engines of the four-stroke cycle type and has for its object an improved construction and method whereby the effective throw of the crank is made to vary during each cycle of two revolutions of the crank-shaft. By these means the piston is caused to traverse the compression space on the exhaust stroke thereby expelling the spent gases completely, and is caused to have a longer travel on the firing stroke thus giving a greater expansion, and further it has a longer suction stroke than would be normally the case. The usual compression space is provided on the completion of the compression stroke.

These objects are attained by providing a crank pin which is inclined to the crankshaft instead of being parallel thereto as is usual, and which is longer than the width of the big end of the connecting rod, and further by providing means for controlling the position and movement of the big end of the connecting rod on the crank pin during each cycle of two revolutions of the crank-shaft. The connecting rod is so mounted as to permit of the sliding movement of the big end of the rod on the crank pin.

In the accompanying drawings which illustrate our invention,

Figure 1 is a view of the crank-shaft and inclined crank pin and one part of the big end of the connecting rod, the position assumed being the commencement of the firing stroke.

Fig. 2 is a side view of a runner mounted in the crank pin.

Figs. 3 and 4 are inside face views of the two parts of the big end of the connecting rod which engage the crank pin, and showing certain cam tracks hereinafter described.

Fig. 5 is an end view of said two parts.

Fig. 6 is a development of the cam tracks seen in Figs. 3 and 4.

Fig. 7 is a side view of the connecting rod, the center part being omitted.

Fig. 8 is a diagram of the four-stroke cycle in a normal engine, and

Fig. 9 is a corresponding diagram of the four-stroke cycle in our improved engine.

Like letters of reference denote similar parts in the different figures.

A is the connecting rod, B the crank shaft, C the crank pin which, as will be seen from Fig. 1, is inclined to the axis of the crank shaft instead of being parallel thereto as in a normal engine, and consequently has a longer throw at one end than at the other end.

The two half bearing blocks D, E which form the big end and inclose the crank pin are bolted together and are furnished with radial studs F, G which enter sockets or holes H, I respectively in the large end of the connecting rod. These studs may be screwed into the bearing blocks. The blocks D, E are narrower than the length of the crank pin, and can slide on said pin from one end to the other. The small end of the connecting rod is connected by means of a pin L to a block K mounted to turn freely on the gudgeon pin M of the piston. Said pin L lies in the same plane as the axis of the radial studs F, G so that the connecting rod is free to swing laterally as the half blocks D, E slide to and fro on the crank pin.

The movements of the blocks D, E are controlled by a runner N, the stem $n$ of which is received in a radial hole O in the crank pin in which it can swivel. The head of the runner, which may be torpedo-shaped, works in a continuous cam groove or track P formed in the inner faces of the blocks D, E and having the shape indicated in Figs. 3 and 4 and in the development shown in Fig. 6, that is to say the groove crosses itself at one point. Two revolutions of the crank shaft are required to cause the runner N to traverse the full length of the groove or track P.

At the commencement of the firing stroke the blocks D, E are at the smallest throw end of the crank pin, the usual compression space being provided, and during the firing stroke the blocks move to the other or largest throw end of the crank pin so that the expansion is increased as compared with what it would be if the throw remained constant. The exhaust stroke is completed while the blocks D, E remain at the largest throw end, and consequently the piston sweeps through the whole of the compression space up to and all but touching the cylinder head. During the suction and compression strokes the blocks D, E move back to the small throw end of the crank pin, reaching the limit of their movement in this direction before the firing stroke is ready to begin. These movements are indicated in the diagram Fig. 9 where the lines 1, 2, 3 and 4 respectively denote the suction, compression, firing and exhaust strokes. The space 5 is the compression space and 6 the extra expansion space. Fig. 8 illustrates a corresponding diagram for a normal engine where the throw of the crank is constant.

It should be noted that in addition to its other movements, the connecting rod has an oscillatory movement about its own axis, to allow of which the piston must oscillate correspondingly in the cylinder. We may further remark that the block K should be so mounted that the connecting pin L is on that side of the gudgeon pin M remote from the larger end of the connecting rod. The cam track P serves also as a lubricating channel.

What we claim is:—

1. In an internal combustion engine, the combination of a piston, a crank, a crank shaft, a crank pin inclined to the crank shaft, a connecting rod having one end capable of sliding laterally on the crank pin, and the other end so mounted as to allow of such lateral sliding movement of the crank pin end of said rod.

2. In an internal combustion engine, the combination of a piston, a crank, a crank shaft, a crank pin inclined to the crank shaft, a connecting rod having one end capable of sliding laterally on the crank pin, and the other end so mounted as to allow of such lateral sliding movement of the crank pin end of said rod, a cam track formed in the bearing blocks of the crank pin end of the connecting rod, said bearing blocks, and a swiveling runner mounted in the crank pin and working in said cam track.

3. In an internal combustion engine, the combination of a piston, a crank, a crank shaft, a crank pin inclined to the crank shaft, a connecting rod having one end capable of sliding laterally on the crank pin, and the other end of said rod connected to the piston by a joint which permits of such lateral movement.

4. In an internal combustion engine, the combination of a piston, a crank, a crank shaft, a crank pin inclined to the crank shaft, a connecting rod having one end capable of sliding laterally on the crank pin, and the other end connected to the gudgeon pin of the piston by means of a joint which permits of such lateral movement.

5. In an internal combustion engine, the combination of a piston, a crank, a crank shaft, a crank pin inclined to the crank shaft, a connecting rod having one end capable of sliding laterally on the crank pin, and the other end so mounted as to allow of such lateral sliding movement of the crank pin end of said rod, a cam track formed in the bearing blocks of the crank pin end of the connecting rod, said bearing blocks, and a swiveling runner mounted in the crank pin and working in said cam track.

THOS. S. JAMES.
E. H. PARRY.
T. H. WILSON.

Witnesses:
GEORGE HARRISON,
HERBERT A. BEESTON.

Copies of this patent may be obtained for five cents each, by addressing the "Commissioner of Patents, Washington, D. C."